(12) United States Patent
Ueda

(10) Patent No.: US 8,891,140 B2
(45) Date of Patent: Nov. 18, 2014

(54) IMAGE READING APPARATUS AND MULTIFUNCTION APPARATUS

(71) Applicant: Oki Data Corporation, Tokyo (JP)

(72) Inventor: Hidenori Ueda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/904,410

(22) Filed: May 29, 2013

(65) Prior Publication Data

US 2013/0321881 A1 Dec. 5, 2013

(30) Foreign Application Priority Data

May 30, 2012 (JP) ................................. 2012-122999

(51) Int. Cl.
 H04N 1/04 (2006.01)
 H04N 1/10 (2006.01)
 H04N 1/00 (2006.01)
 H04N 1/193 (2006.01)
 H04N 1/12 (2006.01)

(52) U.S. Cl.
 CPC ......... *H04N 1/00557* (2013.01); *H04N 1/1017* (2013.01); *H04N 2201/0456* (2013.01); *H04N 1/1039* (2013.01); *H04N 1/193* (2013.01); *H04N 1/12* (2013.01); *H04N 1/1061* (2013.01); *H04N 1/00994* (2013.01); *H04N 1/0464* (2013.01)
 USPC ............................ 358/474; 358/497; 358/486

(58) Field of Classification Search
 CPC .......... H04N 1/00519; H04N 1/00557; H04N 1/00909; H04N 1/00994; H04N 1/0281; H04N 1/0464; H04N 1/1017; H04N 1/1039; H04N 1/1061; H04N 1/12; H04N 1/193; H04N 1/52

USPC .................................. 358/474, 497, 496, 486
 See application file for complete search history.

(56) References Cited

U.S. PATENT DOCUMENTS

| | | | | | |
|---|---|---|---|---|---|
| 4,371,897 | A | * | 2/1983 | Kramer ......................... | 358/474 |
| 4,460,268 | A | * | 7/1984 | Forrester ....................... | 399/210 |
| 4,786,971 | A | * | 11/1988 | Kaneko et al. ............. | 348/231.7 |
| 4,805,067 | A | * | 2/1989 | Amarakoon ................... | 361/212 |
| 5,748,328 | A | * | 5/1998 | Usami et al. ................... | 358/1.9 |
| 5,804,223 | A | * | 9/1998 | Gosdin et al. ................. | 425/130 |
| 5,930,008 | A | * | 7/1999 | Nabeshima et al. .......... | 358/496 |
| 7,016,088 | B2 | * | 3/2006 | Yokota et al. ................. | 358/474 |
| 7,630,102 | B2 | * | 12/2009 | Kurokawa ..................... | 358/474 |
| 7,777,922 | B2 | * | 8/2010 | Sakakibara ................... | 358/474 |
| 8,363,290 | B2 | * | 1/2013 | Shinno et al. ................. | 358/498 |

FOREIGN PATENT DOCUMENTS

JP 2003-222955 A 8/2003

\* cited by examiner

*Primary Examiner* — Negussie Worku
(74) *Attorney, Agent, or Firm* — Panitch Schwarze Belisario & Nadel LLP

(57) ABSTRACT

An image reading apparatus according to the invention includes a transparent member on which an original document is placed, a reading unit arranged below the transparent member, the reading unit being movable reciprocally in a reading direction of the original document, a spacer member arranged at the reading unit for maintaining a prescribed interval between the transparent member and the reading unit by contacting to the transparent member, and an electrostatic removing member arranged at a position close to the spacer member when the reading unit is positioned at a prescribed position.

16 Claims, 4 Drawing Sheets

(a)

(b)

IMAGE READING APPARATUS AND MULTIFUNCTION APPARATUS

CROSS REFERENCE TO RELATED APPLICATION

This application claims priority benefits under 35 USC, section 119 on the basis of Japanese Patent Application No. 2012-122999, the disclosure of which is incorporated herein by reference.

BACKGROUND OF THE INVENTION

1. Field of the Invention

This invention relates to an image reading apparatus and, more particularly, to an image reading apparatus such as, e.g., a scanner and a facsimile machine, as well as to a multifunction apparatus having the image reading apparatus on an image forming apparatus thereof.

2. Description of Related Art

A known image reading apparatus having a reading sensor for reading images on original documents is provided with a spacer member between a reading face glass and the reading sensor to suppress shaking against the depth of focus. With such an apparatus, because static electricity may occur due to triboelectricity generated between the reading face glass and the spacer member according to reciprocal movements of the reading sensor, static electricity noise may enter in the reading sensor and the electric circuits, thereby possibly disordering output images.

To properly dissipate static electricity built between the reading face glass and the spacer member, Japanese Patent Application Publication NO. 2003-222955 discloses an image reading apparatus having a structure dissipating built static electricity via a conductive clip and a metal frame using a conductive member for the spacer member.

With the above prior art, the conductive clip and the metal frame used for conductive connection for static electricity, increase the number of the parts, and make assembly thereof complicated. Use of the metal frame increases the device weight of the reading sensor. Consequently, it requires a drive motor having a larger torque for driving the reading sensor, so that there raises a problem that the apparatus outer size is made larger because of introduction of such a larger motor.

SUMMARY OF THE INVENTION

In consideration of such backgrounds, it is an object of the invention to provide an image reading apparatus and a multifunction apparatus as well, easily assembled, providing lesser load to reciprocal movements of a reading sensor, without subjecting to a larger outer size of the apparatus.

To solve the above problems, an image reading apparatus according to the invention includes a transparent member on which an original document is placed, a reading unit arranged below the transparent member, the reading unit being movable reciprocally in a reading direction of the original document, a spacer member arranged at the reading unit for maintaining a prescribed interval between the transparent member and the reading unit by contacting to the transparent member, and an electrostatic removing member arranged at a position close to the spacer member when the reading unit is positioned at a prescribed position.

A multifunction apparatus according to the invention includes the image reading apparatus having a structure described above, and an image forming apparatus forming an image bases on image information produced by reading the original document at the image reading apparatus.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF EMBODIMENTS

First Embodiment

Figure 1:
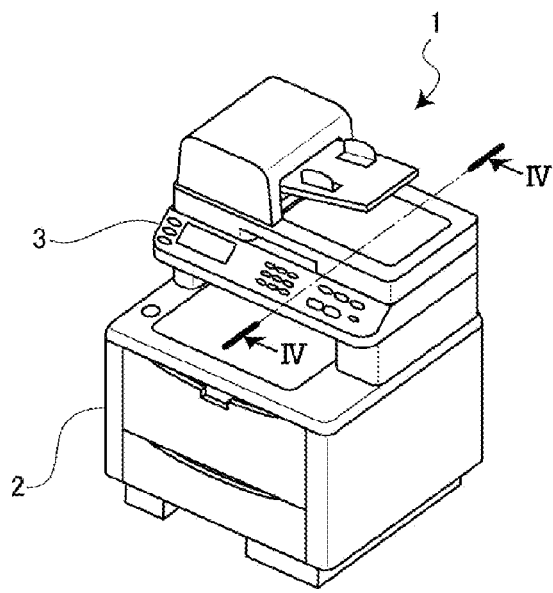
FIG. 1 is a perspective view showing an appearance of a multifunction apparatus according to a first embodiment of the invention.

FIG. 1 is a perspective view showing an appearance of a multifunction apparatus 1 according to a first embodiment of the invention. The multifunction apparatus 1 mainly includes a printer unit 2 serving as an image forming apparatus for forming images on a paper as a recording medium, and a scanner unit serving as an image reading apparatus for reading images on original documents. The printer unit 2 and the scanner unit 3 are connected by a mechanical connecting member, not shown, and are connected electrically via electric members, not shown.

The multifunction apparatus 1 thus formed has functions of i) forming images on the paper with the printer unit 2 upon electrically transmitting to the printer unit 2 image data based on images on the original documents read with the scanner unit 3, ii) forming images on the paper with the printer unit 2 upon reception of electrical signals from external devices such as personal computers, iii) electrically transmitting image data based on the images on the original documents read with the scanner unit 3 to external facsimile machines, and iv) electrically transmitting image data based on the images on the original documents read with the scanner unit 3 to external electrical devices, such as, e.g., personal computers and USB (Universal Serial Bus) memory.

Figure 2:
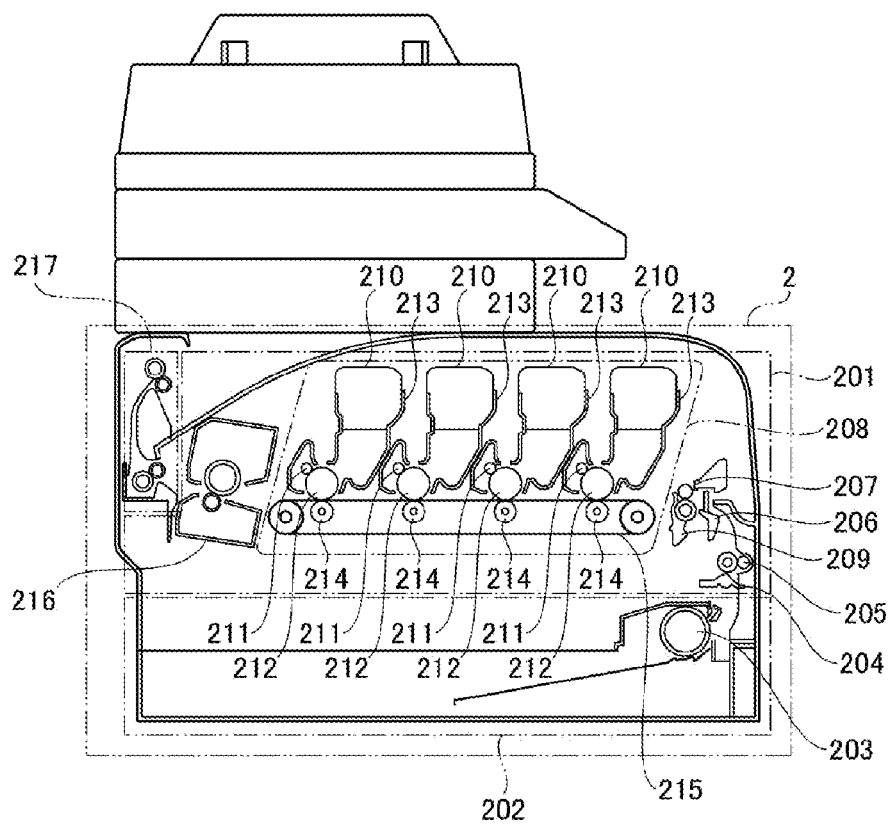
FIG. 2 is a schematic cross section showing a printer unit in the multifunction apparatus according to the first embodiment.

Referring to FIG. 2, a structure of the printer unit 2 in the multifunction apparatus 1 functioning as described above is illustrated. FIG. 2 is a schematic cross section showing the printer unit 2. It is to be noted that, in this embodiment, an example forming images on a paper by means of a LED (Light Emitting Diode) tandem color system as the printer unit 2 is described, but alternatively a laser system, an inkjet system, a dot-matrix impact system may be used as the printer unit 2.

As shown in FIG. 2, the printer unit 2 incorporates a mechanical unit 201 forming and recording images on a paper in use of an electrophotographic method. The printer unit 2 contains paper below the mechanical unit 201 and has one or more of paper cassettes 202 for providing paper to the mechanical unit 201.

A paper feeding roller 203 is equipped inside with a one-way clutch mechanism and feeds paper sheet by sheet out of the paper cassettes 202 to the mechanical unit 201. A sensor 204 detects feeding and passage of paper by means of the paper feeding roller 203. A resistance roller 205 corrects paper's oblique feeding. A sensor 206 detects paper passage at the resistance roller 205. A conveyance roller 207 conveys the paper fed from the resistance roller 205 to an image forming unit 208 provided in the mechanical unit 201. A light sensor 209 detects a timing beginning image formation inside the image forming unit 208.

The image forming unit 208 includes toner cartridges 210 for containing toner, charge rollers 211, printing processing cartridges 213 each having a photosensitive drum 212, and transfer rollers 214, and is provided with a conveyance belt unit 215 for conveying the paper.

The printing processing cartridges 213 are process cartridges forming color images by overlapping toner images in four colors such as, e.g., black, yellow, cyan, and magenta. The respective printing processing cartridges 213 can have the same structure as one another except toner (color) contained in the toner cartridge 210.

The charge roller 211 included in the printing processing cartridge 213 is structured of, e.g., a metal shaft made of stainless steel, and a semi-conductive epichlorohydrin rubber. The charge roller 211 contacts the photosensitive drum 212 with certain pressure and charges uniformly the surface of the photosensitive drum 212 based on a bias voltage given from a high voltage power source, not shown.

The photosensitive drum 212 is structured of a conductive supporter and a photo-conductive layer; it can be a negative charged multilayer photosensitive drum constituted of an electric charge generation layer as the photo-conductive layer, and an electric charge transfer layer, which are formed on the metal shaft made of such as, e.g., aluminum serving as the conductive supporter in a sequentially accumulating manner. The photosensitive drum 212 forms electrostatic latent images based on radiation light such as, e.g., LED light radiated from a printer head, not shown. Toner is supplied from a developing roller, not shown, to the electrostatic latent images formed on the surface of the photosensitive drum 212, thereby developing the toner images.

The conveyance belt unit 215 includes an endless conveyance belt conveying the paper with electrostatic absorption, and transfer rollers 214 transferring the toner images developed on the surface of the respective photosensitive drums 212 of the printing processing cartridges 213, to the paper. The transfer roller 214 transfers the toner image on the surface of the photosensitive drum 212 to the paper based on the bias voltage given from the high voltage power supply, not shown.

The paper to which the toner images are transferred is conveyed to a fixing unit 216. The fixing unit 216 includes a fixing roller, and a fixing backup roller. The fixing roller is formed by providing a heat-resisting elastic layer made of a silicone rubber on a hollow cylindrical core metal made of such as, e.g., aluminum, and providing thereon a PFA (tetrafluoroetylene-perfluoroalkylvinylether copolymer) tube. Formed inside the core metal is a heater such as, e.g., a halogen lamp. The fixing backup roller is formed by providing a heat-resisting elastic layer made of a silicone rubber on a core metal made of such as, e.g., aluminum, and providing thereon a PFA layer and is so arranged as to form a pressurized contact region between the fixing backup roller and the fixing roller. The surface of the fixing roller is maintained at a prescribe temperature with the heater inside the core metal; the paper to which the toner image developed at the printing processing cartridge 213 is transferred, goes by the pressurized contact region formed with the fixing roller and the fixing backup roller and maintained at the prescribed temperature, thereby applying heat and pressure to the toner on the paper, and melting the toner to fix the toner images. The paper passing the fixing unit 216 is delivered outside the printer unit 2 with a delivery unit 217 having a delivery means such as, e.g., delivery rollers.

Figure 3:
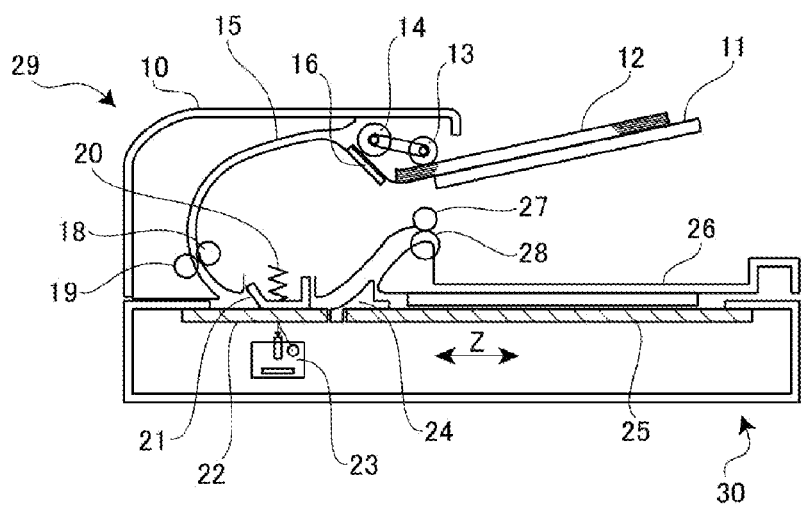
FIG. 3 is a schematic cross section showing a scanner unit in the multifunction apparatus according to the first embodiment.

Next, referring to FIG. 3, a structure of the scanner unit 3 is described. FIG. 3 is a schematic cross section showing the scanner unit 3.

As shown in FIG. 3, the scanner unit 3 is equipped with an automatic document feeder, or ADF 29, arranged above a reading unit 30. An original document tray 11 for setting original documents 12 is formed at the ADF 29. A pickup roller 13 is provided around an end of the original document tray 11 for feeding the original documents 12 to the interior of the ADF 29. The ADF 29 also includes a separation roller 14 for separately feeding sheet by sheet the original documents 12 fed from the pickup roller 13, and a separation pad 16 provided at the opposed position of the separation roller 14.

A conveyance route 15 for the original document 12 is formed inside a housing member 10 of the ADF 29. A conveyance roller 18 is formed at the conveyance route 15, and a pressure roller 19 is formed at a position opposed to the conveyance roller 18 in a manner pressurized contacting to the conveyance roller 18. An original document pushing member 21 pushes the original document 12 fed through the conveyance route 15 against a reading glass 22 for ADF installed inside the reading unit 30 with urging force generated by a spring 20. A delivery roller 27 and a pressure roller 28 eject the original document 12 whose images have completed to be read, to the exterior of the ADF 29.

A reading sensor 23 serving as a reading unit includes a plurality of light sources, not shown, arranged therein, and a plurality of light receiving elements arranged in a line having the same spectroscopic sensitivity feature. The number of the light sources may be three or more, and the color of the light sources can be any color as far as having the different spectroscopic energy feature; for example, if the three primary colors, or red, green, and blue, are used, a color value at that time becomes a RGB value indicated with Red, Green, and Blue (values). The light radiated from the respective light sources is reflected on the original documents 12; the reflected light is received with photoelectric conversion elements 54 serving as photo detectors such as, e.g., a CCD (Charge Coupled Device) image sensor via a convergence means 55 such as an lens array; upon a signal processing such as A/D conversion and so on, image data expressed digitally are obtainable. The reading sensor 23 is connected to a feeding means such as a carriage shifter 56 for reciprocally moving the sensor 23 within the reading unit 30 in arrow Z direction in FIG. 3, or namely in a sub-scanning direction as a direction perpendicular to the main scanning direction, which is photo detectors' parallel extending direction.

The situation shown in FIG. 3 indicates a stop position of the reading sensor 23 during reading of ADF 29, and the reading sensor 23 stops at a position opposing to the original document pushing member 21 astride the reading glass 22 for ADF. An original document pickup member 24 picks up the original document 12 to guide to the delivery roller 27 the original document 12 passing through the reading glass 22 for ADF. A stacker unit 26 stacks the original documents 12 delivered by the delivery roller 27 and the pressure roller 28. A reading glass 25 for flat bed, or FB, serving as a transparent member, is a transparent glass plate having an area size substantially equal to the reading area done by the reading sensor 23. The original document pickup member 24 serves as a cover member for covering or supporting an edge of the reading glass 25 for FB.

Figure 4:
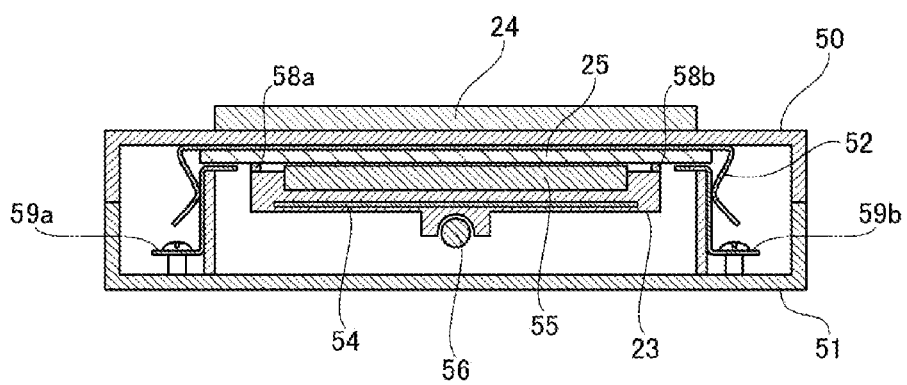
FIG. 4 is a cross section showing a scanner unit cut along IV-IV line in FIG. 1.
Figure 5:
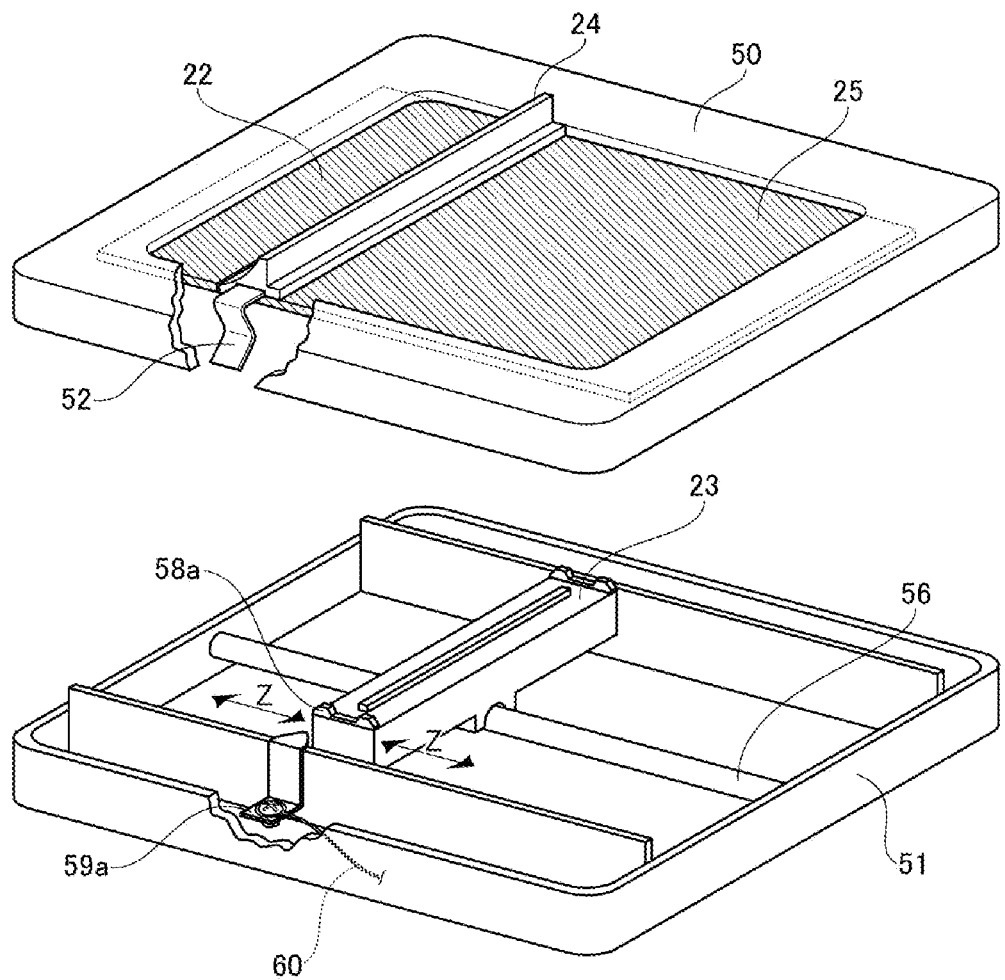
FIG. 5 is an essential exploded perspective view showing a static electricity removing member and its vicinity according to the first embodiment.
Figure 6:
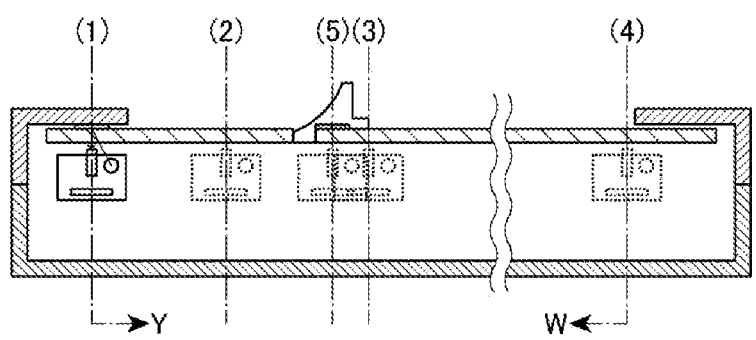
FIG. 6 is a schematic view showing moving portions of the reading sensor according to the first embodiment.

Next, an internal structure of the scanner unit 3 is described in detail in reference to FIG. 4 to FIG. 6. FIG. 4 is a cross section showing a scanner unit cut along IV-IV line in FIG. 1; FIG. 5 is an essential exploded perspective view showing a static electricity removing member and its vicinity; FIG. 6 is a schematic view showing moving portions of the reading sensor.

As shown in FIGS. 4, 5, a housing of the scanner unit 3 is made with an upper casing 50 and a lower casing 51. The original document pickup member 24 described above is formed on the upper casing 50.

A frame ground, or FG, plate 52 is a metal plate member formed in an opened letter-L shape at each in the main scanning direction as to be contactable to electrostatic removing members 59a, 59b described below, and is placed between the reading glass 25 for FB and the upper casing 50.

Spacer members 58a, 58b are arranged at each end of the reading sensor 23 in the main scanning direction on a top of the reading sensor 23, and are placed between the reading glass 25 for FB and the carriage shifter 56 serving as the feeding means for the reading sensor 23.

The electrostatic removing members 59a, 59b are provided at a position shown by number (5) in FIG. 6, or namely out of the reciprocal moving range of the reading sensor 23. The electrostatic removing members 59a, 59b extend in substantially a Z-shape and have one end (tip portion) shaped in substantially a triangle shape. One end of the triangle is provided near the spacer members 58a, 58b, and the other end of the electrostatic removing members 59a, 59b is secured with a screw to the lower casing 51 together with a FG line 60 coupled to the ground level of the apparatus body.

In operation of the multifunction apparatus 1 having the structure described above, first, image forming operation done by the printer unit 2 is described, and then, reading operation of the original document 12 done by the scanner unit 3 and operation about removal of static electricity done by the electrostatic removing members 59a, 59b are described.

First, the image forming operation done by the printer unit 2 is described. Paper loaded on the paper cassettes 202 as shown in FIG. 2 is fed sheet by sheet from the paper cassettes 202 with the paper feeding roller 203, and is conveyed to the conveyance belt unit 215 of the image forming unit 208 formed in the mechanical unit 201 by the conveyance roller 207 while obliquely feeding is corrected by the resistance roller 205.

The toner image developed at the printing processing cartridges 213 in the image forming unit 208 is transferred onto the paper by means of the transfer roller 214 while conveyed by the conveyance belt unit 215. The paper to which the toner image is transferred is conveyed to the fixing unit 216. The fixing unit 216 provides heat and pressure to the toner images on the paper, thereby fixing the toner image upon melting of the toner.

The paper fixed with the toner image is delivered out of the printer unit 2 by the delivery unit 217 having conveying means such as delivery rollers, and the image forming operation done by the printer unit 2 ends.

Next, the reading operation of the original documents 12 done by the scanner unit 3 is described. The reading operation done by the scanner unit 3 includes reading operation for ADF for reading the original document 12 conveyed by the ADF 29 as the reading sensor 23 stays at the prescribed reading position, and reading operation for FB for reading the original document placed on the reading glass 25 for FB as the reading sensor 23 moves in the substrate-scanning direction within the reading unit 30. The reciprocal moving operation is done by a conveying means such as, e.g., the carriage shifter 56, and by a controlling mechanism, not shown, for controlling the conveying means.

The reading operation for FB is described. As shown in FIG. 6, the reading sensor 23 takes a home position as shown by number (1) in FIG. 6 during a waiting mode. When a user sets the original document 12 at the prescribed portion on the reading glass for FB and enters a reading start via a controller unit, not shown, the controlling mechanism, not shown, renders the carriage shifter 56 drive to move the reading sensor 23 in Y direction in FIG. 6.

The reading sensor 23 temporally stops at a position shown by number (2) in FIG. 6, thereby beginning the reading of the original document 12. The reading sensor 23 performs image reading as moving to a position shown by number (4) in FIG. 6, moves in arrow W direction in FIG. 6 when completing the reading operation, and returns to the home position shown by the number (1).

In a case that the multifunction apparatus 1 performs the function, indication by above mentioned i), forming images on the paper with the printer unit 2 upon electrically transmitting to the printer unit 2 image data based on images on the original documents read with the scanner unit 3, the image data expressed digitally are sent to the printer unit 2 through an electrically transmitting member, not shown, and the printer unit 2 receiving those forms images on the paper according to the image forming operation described above.

Next, the reading operation for ADF is described. As shown in FIG. 6, during the waiting mode, the reading sensor 23 is located at the home position shown by number (1) in FIG. 6. When a user sets the original document 12 on the original document tray 11 and enters a reading start via the controller unit, not shown, the controlling mechanism, not shown, renders the carriage shifter 56 drive to move the reading sensor 23 in Y direction in FIG. 6. The reading sensor 23 stops at a position shown by number (2) in FIG. 6, and reads the original document 12 conveyed by the ADF 29.

When the user enters the reading start via the controller unit, not shown, the pickup roller 13 in the ADF 29 starts rotation based on drive force transmitted from a drive unit not shown. According to the rotation of the pickup roller 13, the original documents 12 on the original document tray 11 are fed to the interior of the ADF 29.

The fed original documents 12 are subject to braking on a side of the separation pad 16 from operation of the separation roller 14 and the separation pad 16, and the original document 12 only on a side of the separation roller 14 is separately fed to the interior of the ADF 29. The separately fed original document 12 proceeds in the conveyance route 15 and is conveyed on the reading glass 22 for ADF as maintaining the conveyance force given from the conveyance roller 18 and the pressure roller 19. The original document 12 is conveyed without floating from the reading glass 22 for ADF by operation of the original document pushing member 21 obtaining the urging force from the spring 20, and the reading sensor 23 reads the images.

The original document 12 that the reading sensor 23 completed reading the images thereon is conveyed in a direction of the delivery roller 27 by the original document pickup member 24, and is delivered to the stacker unit 26 by the delivery roller 26 and the pressure roller 28.

Where the multifunction apparatus 1 performs the function, indication by above mentioned i), forming images on the paper with the printer unit 2 upon electrically transmitting to the printer unit 2 image data based on images on the original documents read with the scanner unit 3, the image data expressed digitally are sent to the printer unit 2 through an electrically transmitting member, not shown, and the printer unit 2 receiving those forms images on the paper according to the image forming operation described above.

Operation about electrostatic removal done by the electrostatic removing members 59a, 59b is described next.

In operation of reading for FB, where the reading sensor 23 reciprocally moves within the reading unit 30 in a direction shown by arrow Z shown in FIG. 5, the spacer members 58a, 58b arranged at each end in the main scanning direction on a top of the reading sensor 23 reciprocally move as contacting to the reading glass 22 for ADF and the reading glass 25 for FB, so that static electricity is built due to turboelectric charging. The static electricity built due to turboelectric charging is dissipated to the ground of the apparatus body through gas discharge, because the tip portion shaped in the triangle of the spacer members 58a, 58b plays a role of a lightning rod when the reading sensor 23 passes a position of number (5) in FIG. 6.

Static electricity may be also built due to turboelectric charging when the original document 12 passes the original document pickup member 24 during the ADF reading operation. The static electricity built due to turboelectric charging is to be dissipated to the ground of the apparatus body through connection between the FG plate 52 formed inside below the pickup member 24 and the electrostatic removing members 59a, 59b, within the reading unit 30.

As described above, according to the first embodiment, because the static electricity built due to turboelectric charging can be eliminated without contacting to the reading sensor, the reciprocal movement of the reading sensor is prevented from receiving loads. The electrostatic removing members according to this embodiment have a relatively simple structure, so that the apparatus can be assembled easily, and so that the apparatus can be avoided from being made in a larger size.

Second Embodiment

A multifunction apparatus according to the second embodiment has substantially the same structure as the multifunction apparatus 1 described in the first embodiment. Accordingly, in the description of the second embodiment, the different portions are described while any description of the same portions as in the first embodiment is omitted.

Figure 7:
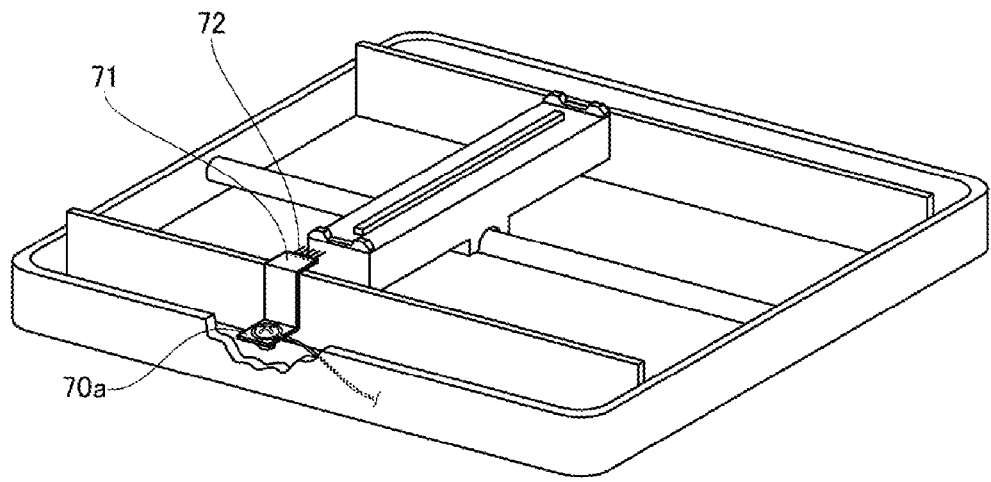
FIG. 7 is an essential exploded perspective view showing an electrostatic removing member and its vicinity according to a second embodiment of the invention.

FIG. 7 is an essential exploded perspective view showing an electrostatic removing member and its vicinity according to the second embodiment. The electrostatic removing member 71 is provided out of the reciprocal movement range of the reading sensor 23, and a tip portion 72 of the member is formed in a brush shape. The tip portion 72 is disposed near the spacer members 58a, 58b, and one end on the opposite side is adhered to the FG plate 70a coupled to the ground level of the apparatus body by a conductive double side tape, not shown.

Next, the operation for electrostatic removal done by the electrostatic removing member 71 is described.

In operation of reading for FB, where the reading sensor 23 reciprocally moves within the reading unit 30 in the direction shown by arrow Z shown in FIG. 5, the spacer members 58a, 58b arranged at each end in the main scanning direction on a top of the reading sensor 23 reciprocally move as contacting to the reading glass 22 for ADF and the reading glass 25 for FB, so that static electricity is built due to turboelectric charging. The static electricity built due to turboelectric charging is dissipated to the ground of the apparatus body through the FG plate 70a, because the reading sensor 23 comes in contact with the tip portion formed in the brush shape to be in a mechanical contacting mode when passing a position of number (5) in FIG. 6.

Static electricity may be also built due to turboelectric charging when the original document 12 passes the original document pickup member 24 during the ADF reading operation. The static electricity built due to turboelectric charging is to be dissipated to the ground of the apparatus body through connection between the FG plate 52 formed inside below the pickup member 24 and the electrostatic removing member 71, within the reading unit 30.

As described above, according to the second embodiment, because the static electricity built due to turboelectric charging can be eliminated without contacting to the reading sensor, the reciprocal movement of the reading sensor is prevented from receiving loads. The electrostatic removing members according to this embodiment have a relatively simple structure, so that the apparatus can be assembled easily, and so that the apparatus can be avoided from being made in a larger size. According to the second embodiment, no discharge shock in accordance with gas discharge of the static electricity occurs, so that electrostatic removing operation can be performed without affecting reading of the original documents.

MODIFIED EXAMPLE

Figure 8:
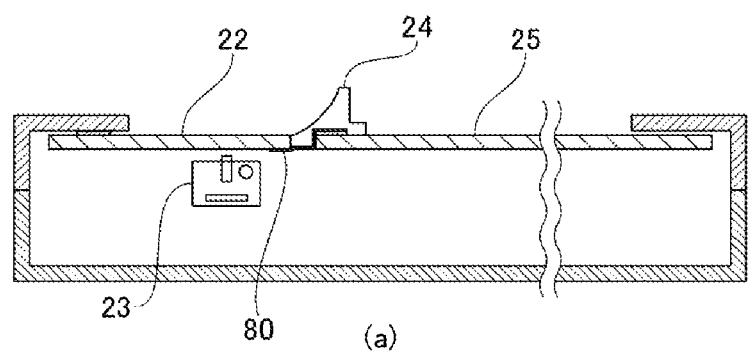
FIG. 8 is a schematic view showing a structure of a modified example according to the invention.
Figure 8:
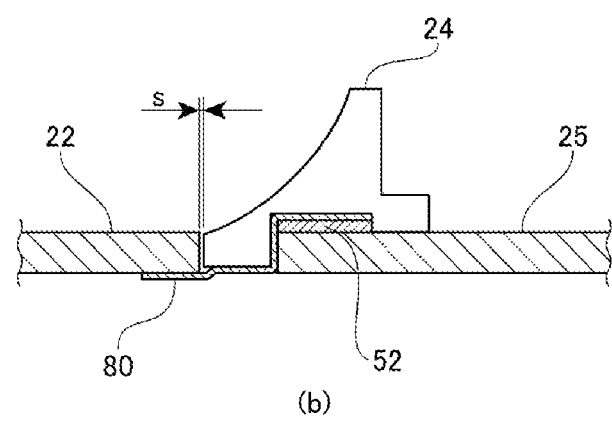

Next, a modified example according to the invention is described. FIG. 8(a) is a schematic view showing a structure of the modified example; FIG. 8(b) is a partial enlarged view of FIG. 8(a). As shown in FIGS. 8(a), 8(b), a gap S may occur between the reading glass 22 for ADF and the original document pickup member 24 due to deviations in part's size and deviations during assembling. If such a gap S is formed, static electricity may flow to the reading sensor 23 through passing the gap S from the original document 12 conveyed through the reading glass 33 for ADF and the original document pickup member 24.

With the modified example, in order to prevent this flow, a conductive tape member 80 serving as a second conductive member as shown in FIGS. 8(a), 8(b), is adhered. The conductive tape member 80 can be such as, e.g., aluminum and copper as its material but can be any material in selection as far as showing conductivity.

As shown in FIG. 8(b), the conductive tape member 80 seals the gap S and is adhered to be coupled to the FG plate 52. The conductive tape member 80 is located below the original document pickup member 24 as to extend to the lower side of the reading glass 22 for ADF. The conductive tape member 80 is adhered across the whole connection part between the reading glass 22 for ADF and the original document pickup member 24, as extending in the main scanning direction of the reading sensor 23. The spacer members 58a, 58b come in contact with the conductive tape member 80 at a position below the original document pickup member 24 as the reading sensor 23 moves. The static electricity built due to turboelectric charging from the original document 12 conveyed through the reading glass 33 for ADF and the original document pickup member 24, can be dissipated to the ground of the apparatus body via the FG plate 52 upon conductive connection through the conductive tape member 80, by adhering the conductive tape member 80 thus formed.

This invention is applicable to image reading apparatuses such as scanners and facsimile machines and to multifunction apparatuses having such an image reading apparatus on the image forming apparatus, such as, e.g., photocopiers.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An image reading apparatus comprising:
   a transparent member on which an original document is placed;
   a reading unit arranged below the transparent member, the reading unit being movable reciprocally in a reading direction of the original document;
   a spacer member arranged at the reading unit for maintaining a prescribed interval between the transparent member and the reading unit by contacting to the transparent member; and
   an electrostatic removing member arranged at a position close to the spacer member when the reading unit is positioned at a prescribed position, the electrostatic removing member provided at a position outside an original document readable range in the reciprocal movement of the reading unit, the electrostatic removing member provided extending from outside a range of the reciprocal movement toward a region of the reciprocal movement of the reading unit, and the electrostatic removing member removing static electricity when the reading unit comes closely to the electrostatic removing member during reciprocal movement thereof.

2. The image reading apparatus according to claim 1,
   wherein the transparent member is provided in a number of two,
   wherein the spacer member comes closely to the electrostatic removing member when the reading unit is positioned at a boundary position coupling between the transparent members, and
   wherein the electrostatic removing member is provided at the boundary position extending toward the region of the reciprocal movement of the reading unit.

3. The image reading apparatus according to claim 1, further comprising a cover member for covering an edge of the transparent member, wherein the spacer member comes closely to the electrostatic removing member when the reading unit is positioned below the cover member,
   wherein the electrostatic removing member is provided at a position below the cover member extending toward the region of the reciprocal movement of the reading unit.

4. The image reading apparatus according to claim 3, and further comprising a first conductive member provided between the cover member and the transparent member and coupled to the electrostatic removing member.

5. The image reading apparatus according to claim 3, and further comprising a second conductive member coupled to the first conductive member and provided as extending to a lower side of the transparent member through a gap between the cover member and the transparent member, the second conductive member contacting to the spacer member at the prescribed portion.

6. The image reading apparatus according to claim 1, wherein the electrostatic removing member is coupled to the spacer member in either a contacting fashion or a non-contacting fashion.

7. The image reading apparatus according to claim 1, wherein the electrostatic removing member is brush-like member contacting to the spacer member.

8. A multifunction apparatus comprising:
   the image reading apparatus as set forth in claim 1; and
   an image forming apparatus forming an image bases on image information produced by reading the original document at the image reading apparatus.

9. An image reading apparatus comprising:
   a transparent member on which an original document is placed;
   a reading unit arranged below the transparent member, the reading unit being movable reciprocally in a reading direction of the original document;
   a spacer member arranged at the reading unit for maintaining a prescribed interval between the transparent member and the reading unit by contacting to the transparent member; and
   an electrostatic removing member for discharging, when the reading unit is positioned at a prescribed position, static electricity generated at the spacer member, the electrostatic removing member provided at a position outside an original document readable range in the reciprocal movement of the reading unit, the electrostatic removing member provided extending from outside a range of the reciprocal movement toward a region of the reciprocal movement of the reading unit, and the electrostatic removing member removing static electricity when the reading unit comes closely to the electrostatic removing member during reciprocal movement thereof.

10. The image reading apparatus according to claim 9,
    wherein the transparent member is provided in a number of two,
    wherein the spacer member comes closely to the electrostatic removing member when the reading unit is positioned at a boundary position coupling between the transparent members, and
    wherein the electrostatic removing member is provided at the boundary position extending toward the region of the reciprocal movement of the reading unit.

11. The image reading apparatus according to claim 9, further comprising a cover member for covering an edge of the transparent member, wherein the spacer member comes closely to the electrostatic removing member when the reading unit is positioned below the cover member,
    wherein the electrostatic removing member is provided at a position below the cover member extending toward the region of the reciprocal movement of the reading unit.

12. The image reading apparatus according to claim 11, and further comprising a first conductive member provided between the cover member and the transparent member and coupled to the electrostatic removing member.

13. The image reading apparatus according to claim 11, and further comprising a second conductive member coupled to the first conductive member and provided as extending to a lower side of the transparent member through a gap between the cover member and the transparent member, the second conductive member contacting to the spacer member at the prescribed portion.

14. The image reading apparatus according to claim 9, wherein the electrostatic removing member is coupled to the spacer member in either a contacting fashion or a non-contacting fashion.

15. The image reading apparatus according to claim 9, wherein the electrostatic removing member is brush-like member contacting to the spacer member.

16. A multifunction apparatus comprising:
   the image reading apparatus as set forth in claim 9; and
   an image forming apparatus forming an image bases on image information produced by reading the original document at the image reading apparatus.

* * * * *